Aug. 7, 1956  G. A. KENDALL ET AL  2,757,546
MECHANICAL MOVEMENT

Filed July 21, 1952  3 Sheets-Sheet 1

George A. Kendall
Alex W. Chriscaden
INVENTORS

BY Winston E. Miller
ATTORNEY

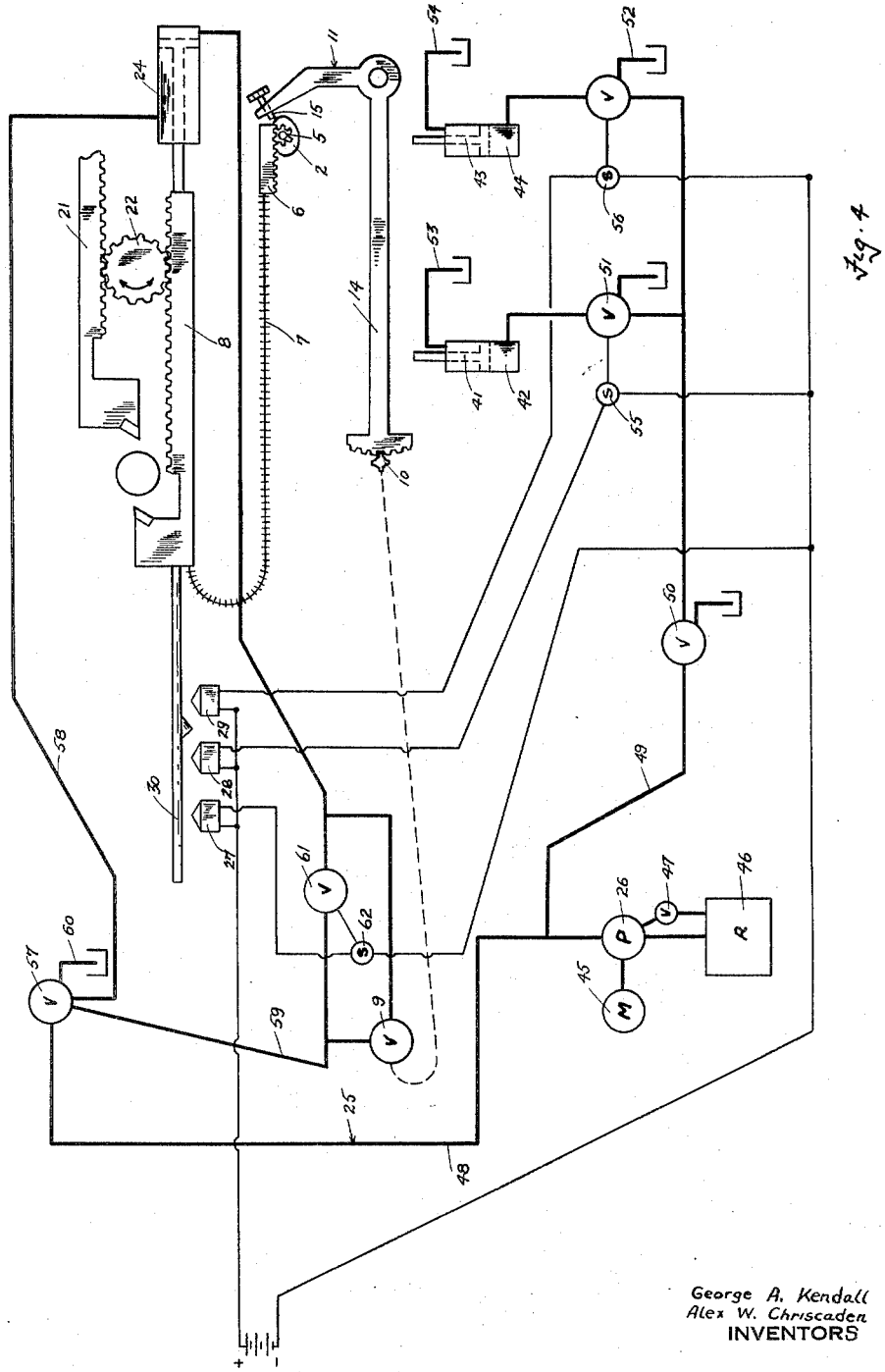

United States Patent Office 2,757,546
Patented Aug. 7, 1956

2,757,546

MECHANICAL MOVEMENT

George A. Kendall and Alex W. Chriscaden, Saginaw, Mich., assignors to Wickes Brothers, Division of The Wickes Corporation, Saginaw, Mich., a corporation of Michigan Application July 21, 1952, Serial No. 300,008

1 Claim. (Cl. 74—96)

This invention relates to a control for regulating the feed cycle of machine tools and related equipment, and more particularly to a control for regulating the feed cycle of metal turning lathes on which the tool feed is hydraulically actuated.

On machines having a constant spindle speed and adapted to use single or multiple tools, it is often desirable to suddenly change the rate of tool feed because of shoulders and the like on the stock to be worked, on which the amount of stock to be cut is much greater or lesser. Moreover, even with a constant spindle speed, the stock might be such that the amount to be cut is gradually increasing or decreasing, and in which case it is necessary to continuously vary the rate of feed.

In facing cuts of any appreciable length, the spindle speed is continuously increased thereby making it necessary to continuously vary the rate of movement of the tool slides in order to maintain a constant rate of feed per revolution of spindle.

Since it is often desirable to combine any or all of the above conditions in order to achieve the most efficient tool cutting cycle, it is, therefore, one of the objects of our invention to provide means thereof for accomplishing same.

Also, as is well known, when a conventional crankshaft lathe is adapted for automatic control of the tool feed, it requires a variable displacement hydraulic pump circuit, equipped with various means for controlling the rate of feed pattern to the tool. In changing to a constant displacement hydraulic pump circuit, in which a metering valve is used to control the rate of feed, a means for controlling the metering valve is required. The usual means for controlling the tool feed with such a circuit is as follows:

1. Placing a metering valve in the circuit with the hydraulic cylinder or fluid motor that actuates the tool feed and manually adjusting the desired rate of feed of the metering valve. This operation is useful only when one unchanging rate of feed is used throughout the cycle.

2. Using two or more metering valves whereby the limit switches actuated by the movement of the tool feed will in turn actuate hydraulic valves that bring the desired metering valves into the circuit at the designated times, each metering valve having been previously set by hand for the proper rate of tool feed. This system provides for instantaneous changes in the rate of feed but does not allow for continuously variable rates of feed.

3. Using one metering valve operated by a cam which is actuated by the tool feed movement. With this system continuously variable rates of feed can be attained, but instantaneous changes in rate of feed are impossible. In fact, the rate of change in the tool feed is limited by the physical characteristics of the cam.

A combination of the last two methods above can be used to attain all of the various required feed cycles, but since numerous metering valves and auxiliary valves are required, it is, therefore, another object of this invention to provide a mechanism for accomplishing these results with less complicated equipment.

Another object of the present invention is to provide a control mechanism that will attain all of the various feed conditions and which requires only one basic hydraulic circuit and one metering valve.

A further object of the present invention is the provision of means whereby the tool feed is automatically and simply controlled by the use of a small cam, which can be easily removed on machines for which no part of the cycle requires a continuously variable feed.

Another object is to provide a control mechanism which is simple and rugged in construction and is easily adapted to any type of lathe.

A further object of the invention is to provide a tool feed control which is more compact and easier to manufacture than any known mechanism.

Another object of the invention is to provide for a large number of small cams which may be easily machined and stored in a small space.

Other objects and purposes of this invention will become apparent to persons familiar with this type of equipment upon reference to the accompanying drawings and upon reading the following specification.

In meeting the above objects and purposes, as well as others incidental thereto and associated therewith, I have utilized a conventional crankshaft lathe, having the usual tool slides and tool holders, and have attached one of the tool slides to a hydraulic cylinder, which is connected to a metering valve. The metering valve is connected to an energizing pump which is of a type wherein the output is constant. A bell crank is provided having means on one arm adapted for adjusting the metering valve in response to pivotal movement of the bell crank. The bell crank has a cam follower mounted at the other end thereof which bears against a rotative cam, thereby controlling the positions of the bell crank and directly effecting the amount of fluid that is pumped to the hydraulic cylinder.

For illustration of a preferred embodiment of the invention, attention is directed to the accompanying drawings in which:

Figure 4 is a diagrammatic layout of the hydraulic circuit and the cycling device.

Figure 1:
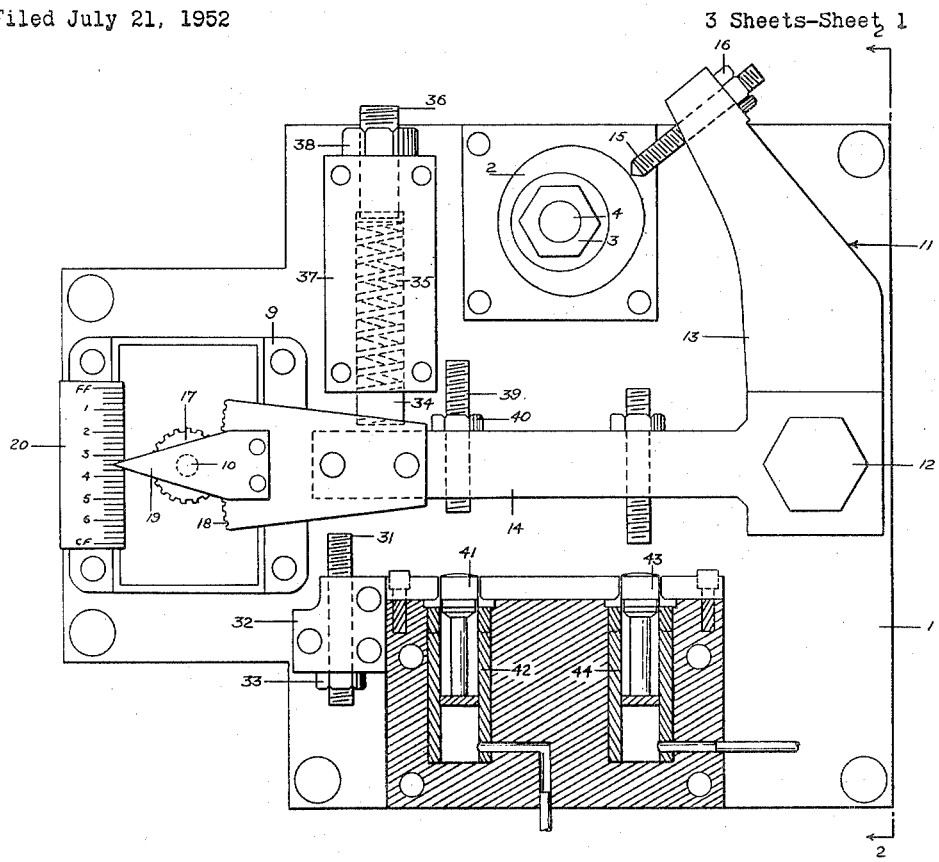
Figure 1 is a front elevation of the hydraulic cycling device.
Figure 3:
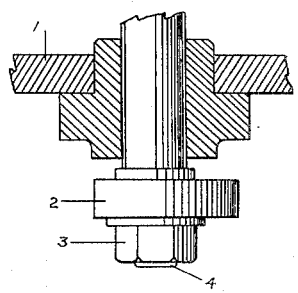
Figure 3 is a sectional view showing the cam mounted in the holder.
Figure 2:
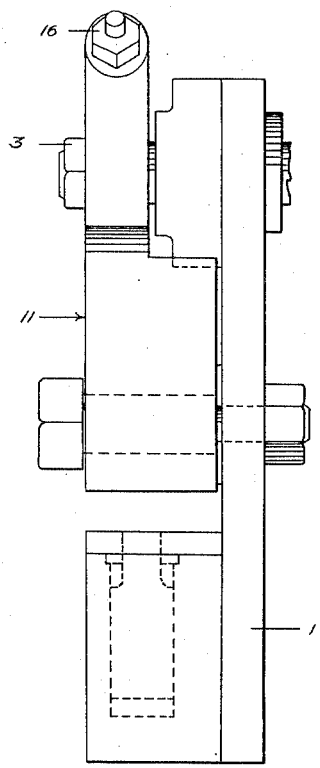
Figure 2 is a side elevation of the hydraulic cycling device taken on line 2—2 of Figure 1.

Referring now to the drawings, the back plate 1 is provided as a base upon which the rest of the apparatus is mounted and by which the apparatus is in turn mounted in a convenient place on or near a lathe. A cam 2 is held in any conventional manner by the nut 3 on a shaft 4, which shaft is mounted in bearings on to said back plate 1. A gear 5 (Figure 4) is mounted on said shaft 4, said gear having teeth which mesh with teeth on a slide bar 6. A flexible cable 7 is attached to said slide bar and to the tool slide 8, so as to cause rotation of the cam in response to the movement of the tool slide.

A metering valve 9 is connected with a shaft 10, rotation of which shaft varies the capacity of said valve and is preferably mounted on the back plate 1. A bell crank 11 is pivotally mounted at its apex 12 on the back plate 1 in such position that the free end of its arm 13 is located adjacent the cam 2 and the free end of its arm 14 is located adjacent the shaft 10. At the free end of the arm 13 there is mounted a cam follower 15, which may be mounted in any convenient manner as by tapping same through said arm and locking same in place by the lock nut 16. The free end of the arm 14 is associated with the shaft 10 in such a manner that pivotal movement of the bell crank in one direction or the other will cause rotation of said shaft. In the embodiment shown, this is accomplished by providing a gear 17 on the end of said shaft and causing its teeth to mesh with teeth 18 on the end of said bell crank arm 14. An indicator 19 may, if desired, be provided on the end of one arm of the bell crank as the arm 14, and be caused to associate with a scale 20 for indicating the position of said metering valve.

Tool slides 8 and 21 are interconnected by a gear 22 and one tool slide, here the tool slide 8, is connected by a rod 23 to the operating piston of a hydraulic cylinder 24. Said cylinder is connected at each of its ends through a piping system 25 to the output connections of a constant delivery pump 26, whereby output from said pump will cause movement of said rod 23 in one direction or the other at a rate and in a direction corresponding to the positioning of the several valves including said metering valve 9. The limit switches 27 and 28, and 29 are provided to engage an extension 30, which is attached to one end of said tool slide 8.

A threaded abutment 31 can be adjusted and secured in position on a suitable base 32 by a lock nut 33, so as to limit the downward movement of the bell crank. An adjustable pin 34 is attached to a spring 35, connected to the threaded abutment 36 in the block 37, in order to position the bell crank and control the upper most limit through which the bell crank can travel. This threaded abutment can be secured in position by a lock nut 38. The adjustable pin is made sufficiently resilient to provide suitable support in any position, regardless of the height that the bell crank is lifted by the threaded abutment 31.

A threaded abutment 39 is tapped on one arm of the bell crank and may be adjusted and positioned by a lock nut 40. A pair of hydraulic lifters comprise a plunger 41 received into a cylinder 42 and a plunger 43 received into a cylinder 44. Each of said lifters is so positioned that the respective plungers bear against the underside of the arm 14 of the bell crank for pushing said bell crank upwardly when required as described below.

Turning now to the hydraulic connections, a pump 26 is driven by a motor 45 at a constant rate of speed and is adapted for supplying pressure fluid at a constant rate. The reservoir 46 supplies said pump and the relief valve 47 is utilized, as needed, to limit the output pressure of said pump.

The said pump 26 discharges into a conduit 48 from which leads the conduit 49 which connects through the pressure reducing valve 50 and the solenoid controlled valves 51 and 52 to the cylinders 42 and 44 respectively. Drain lines 53 and 54 from said cylinders 42 and 44 return in any conventional manner to connections leading to the reservoir 46. Thus, upon actuation of the solenoids 55 or 56, their respectively connected valves may be opened or closed and the plungers 41 and 43 correspondingly urged upward or permitted to return downwardly.

The pressure source is also connected through the directional valve 57 and thence by the conduits 58 and 59 to the respective ends of the hydraulic cylinder 24. Said directional control valve 57 is a four way valve including a return line 60 by which fluid may be returned to the reservoir.

Interposed in the line 59 is a metering valve 9 which limits the flow of oil from the cylinder and controls the rate of feed of the tool slides. A solenoid operated valve 61 permits full volume pump flow to the cylinder 24 for rapid traverse movement of the tool slides.

*Operation*

In the following description of the operation of the device, reference first will be made to the mechanical portions thereof, and thence the description will proceed to the hydraulic features. In operating the device, a cam of suitable contour will be placed in the position indicated by the cam 2 and said cam will be rotated by the slide bar 6 in response to movement of the tool slide 8 of the lathe. As the cam follower 15 reaches a high point on the cam the bell crank will cause the shaft 10 to rotate in a counterclockwise direction, as appearing in Figure 1, and this will adjust the capacity of the metering valve to cause a predetermined operation of the hydraulic cylinder 24 and thereby a correspondingly predetermined movement of the rod 23. This, for purposes of illustration, may be assumed to be in a direction to increase the speed of movement of the tools toward the work and thereby increase the rate of feed. As the cam radius diminishes, the cam follower will effect an opposite movement of the bell crank and thereby cause a clockwise movement of said shaft 10 and this will diminish the flow of oil for urging the tool holders toward the work.

Inasmuch as the cam 2 may be made to rotate very slowly, a relatively small cam will be effective for controlling the cycle for a relatively long piece of work.

Inasmuch as the cam 2 may be readily changed and can be stored in a small place, the use of such automatic control is greatly facilitated by the greater ease of removing and attaching such controlling cams, by the greatly reduced amount of work required to make such a cam and by the greater ease of storing such cams.

If at any time during the cycle it is desired to use a predetermined fixed rate of feed, either of the solenoids 55 and 56 can be deenergized. With pressure being supplied from the pump 26, pressure may be admitted into one of the cylinders 42 or 44 by opening one of the valves 51 or 52. This will actuate the cylinder corresponding to the valve so opened and it will move upwardly and engage one of the abutments 39 and thereby move the arm 14. The distance that arm 14 will move will depend upon the position of a given abutment with respect to said arm. Upon the movement of the arm 14, the metering valve shaft 10 is caused to rotate a distance moved by said arm and thereby adjust the capacity of the metering valve 9. Upon the closing of each of the valves 51 or 52, and without the application of the cam, the arm 14 will be forced by the spring 35 against the abutment 31, thereby giving the maximum predetermined rate of feed.

Now turning to the details of the hydraulic circuit, in the idle condition, with all solenoids de-energized, delivery of the pump 26 is unloaded to the reservoir 46 through the valve 47. Maximum operating pressure is controlled by adjustment of the valve 47 which also provides overload protection for the pump 26 and the electric motor 45. The several solenoids may be assumed to be energized and, in such energized position, to be holding respectively connected valves in closed position.

The arm 14 of the bell crank will be held in downward position by the spring backed pin 34 inasmuch as no hydraulic pressure is exerted against the plungers 41 and 43.

For the commencement of operations the lathe spindle starts rotating allowing direct pressure fluid through the line 58 into the leftward end of the cylinder 24. This imposes full volume of the pump onto the tool feed mechanism and moves it toward the work at maximum speed. The valve 61 is open to permit the full volume of the pump to return from the cylinder 24. As the extension 30 moves far enough to trip the limit switch 27, the solenoid 62 of valve 61 is de-energized and the valve 61 becomes blocked. This causes oil in the line 59, returning from the cylinder 24, to go through the metering valve 9 and thus, the rate of feed is determined by the setting of said metering valve 9. This, as described above, is determined by the shape of the cam 2 excepting as modified by the action of the plungers 41 and 43.

When the extension is moved sufficiently further to trip the limit switch 28, then the solenoid of one of the plungers 42 and 44, as the solenoid 62, is de-energized and the valves 51 and 52 are thereby permitted to open.

This permits hydraulic pressure to enter the lower end of the cylinders 42 and 44 and thus move the plungers 41 and 43 upwardly, thereby moving the arm 14 upwardly against the spring 35. This effects an immediate and sudden rotation of the shaft 10 and thereby effects a correspondingly immediate and sudden adjustment of the metering valve 9. This correspondingly changes the rate of flow of pressure fluid with respect to the cylinder 24 and thereby effects a correspondingly sudden and abrupt change in the rate of travel of the tool slides 8 and 21. When the extension trips the limit switch 29 a further actuation of one of said solenoids 55 and 56 is effected and a further stepwise change in the rate of speed of tool feed is correspondingly brought about. It will be appreciated that the limit switch 29 may actuate the solenoid 56 to open the valve 52 and thereby actuate the plunger 43 for the purpose of moving the arm 14 further upwardly, or the actuation of said limit switch 29 may function to act on the solenoid 55 to close the valve 51 and permit the plunger 41 to return to a lowered position.

It will be further recognized that actuation of the plungers 41 and 43 will rotate the bell crank in a clockwise direction, as appearing in Figure 4, and thereby lift the cam follower off the cam 2. This may be temporary to enable a change in feeding rate to be effected more suddenly than could be brought about by a sudden rise in the cam, or it may be a movement which disconnects the cam from control over the remainder of the feeding operation. It will be recognized that by proper selection of cam shape together wtih proper selection of limit switches and their connection to either or both of the cylinders 42 and 44, and, if desired, the provision of further cylinders corresponding to cylinders 42 and 44, that practically any pattern of feeding movement can be attained and that such feeding may involve either gradual or sudden changes in feed rate as desired.

It will be recognized that the remainder of the automatic cycle, including the return of tools after they have completed their movements, would be in accordance with established practice.

Although specific reference has been made in the foregoing to the use of the device as a control mechanism for regulating the feed cycle of lathes, it will be appreciated that the said device is equally applicable to other types of machinery. Furthermore, although the above mentioned drawings and descriptions apply to one particular embodiment of the invention, it is not our intention, implied or otherwise to eliminate other variations or modifications which do not depart from the scope of the invention unless specifically stated to the contrary in the hereinafter appended claim.

We claim:

Apparatus of the character described, including: a base, a bell crank pivotally mounted at its apex on said base, a cam member rotatably mounted on said base, means for rotating said cam member, an adjustable cam follower on said bell crank at its one end thereof and adapted to contact said cam member, adjustable limiting abutments on said bell crank adjacent its other end thereof, a second abutment on said base for manually limiting the movement of said bell crank, a spring-backed pin on said base in opposing relationship to said second abutment to position and control movement of said bell crank, lifters positioned on said base responsive to driving means and adapted to contact said adjustable limiting abutments and further position said bell crank.

References Cited in the file of this patent

UNITED STATES PATENTS

| | | |
|---|---|---|
| 853,693 | Healey | May 14, 1907 |
| 1,133,343 | Van Hoesen | Mar. 30, 1915 |
| 1,205,354 | Kadow | Nov. 21, 1916 |
| 1,506,588 | Hurst | Aug. 26, 1924 |
| 1,519,157 | Muller | Dec. 16, 1924 |
| 1,835,322 | Olin | Dec. 8, 1931 |
| 2,020,765 | Breitenbach | Nov. 12, 1935 |
| 2,173,135 | Von Zimmerman | Sept. 19, 1939 |
| 2,214,558 | Kronmiller | Sept. 10, 1940 |
| 2,375,831 | Turchan | May 15, 1945 |
| 2,620,823 | Adams | Dec. 9, 1952 |

FOREIGN PATENTS

| | | |
|---|---|---|
| 216,791 | Great Britain | 1924 |
| 264,396 | Great Britain | 1927 |